(12) United States Patent
Braun et al.

(10) Patent No.: US 8,707,038 B2
(45) Date of Patent: Apr. 22, 2014

(54) METHOD FOR THE ENCRYPTED DATA EXCHANGE AND COMMUNICATION SYSTEM

(75) Inventors: Michael Braun, München (DE); Anton Kargl, München (DE); Bernd Meyer, München (DE)

(73) Assignee: Siemens Aktiengesellschaft, Munich (DE)

( * ) Notice: Subject to any disclaimer, the term of this patent is extended or adjusted under 35 U.S.C. 154(b) by 394 days.

(21) Appl. No.: 12/443,311

(22) PCT Filed: Sep. 24, 2007

(86) PCT No.: PCT/EP2007/060113
§ 371 (c)(1),
(2), (4) Date: Mar. 27, 2009

(87) PCT Pub. No.: WO2008/040655
PCT Pub. Date: Apr. 10, 2008

(65) Prior Publication Data
US 2009/0292921 A1 Nov. 26, 2009

(30) Foreign Application Priority Data

Sep. 29, 2006 (DE) .................. 10 2006 046 226
Jan. 3, 2007 (DE) .................. 10 2007 001 070

(51) Int. Cl.
*H04L 9/32* (2006.01)
(52) U.S. Cl.
USPC .......... 713/168; 713/169; 713/170; 713/173; 713/176; 380/28; 380/30; 726/2; 726/3; 726/4; 726/5

(58) Field of Classification Search
None
See application file for complete search history.

(56) References Cited

U.S. PATENT DOCUMENTS 6,038,581 A * 3/2000 Aoki et al. .................. 708/492
6,876,745 B1 4/2005 Kurumatani
(Continued)

FOREIGN PATENT DOCUMENTS

DE 10161138 7/2003
EP 1675300 6/2006
(Continued)

OTHER PUBLICATIONS

Klaus Finkenzeller, "RFID Handbuch", 3. aktualisierte und erweiterte Auflage, Carl Hanser Verlag, Munich, 2002; Book.

(Continued)

*Primary Examiner* — Jung Kim
*Assistant Examiner* — Adrian Stoica
(74) *Attorney, Agent, or Firm* — Staas & Halsey LLP

(57) ABSTRACT

The embodiments relate to a method for the encrypted data exchange between subscribers of a communication system using cryptography based on elliptical curves, wherein upon a query by a first subscriber a scalar multiplication is calculated by the second subscriber, wherein merely part of the result of the scalar multiplication is returned to the first subscriber as a response. The invention relates to a communication system.

23 Claims, 5 Drawing Sheets

(56) References Cited

U.S. PATENT DOCUMENTS

| | | | |
|---|---|---|---|
| 7,617,395 B2 | 11/2009 | Sasaki et al. | |
| 7,949,872 B2 | 5/2011 | Sasaki et al. | |
| 2003/0120611 A1* | 6/2003 | Yoshino et al. | 705/67 |
| 2003/0156714 A1* | 8/2003 | Okeya | 380/30 |
| 2004/0031857 A1* | 2/2004 | Sato | 235/492 |
| 2006/0179319 A1 | 8/2006 | Krawczyk | |
| 2007/0043946 A1* | 2/2007 | Lauter et al. | 713/171 |
| 2007/0053506 A1* | 3/2007 | Takashima | 380/28 |
| 2007/0211893 A1* | 9/2007 | Frosik et al. | 380/30 |
| 2007/0248224 A1* | 10/2007 | Buskey et al. | 380/30 |
| 2008/0016346 A1* | 1/2008 | Harrison et al. | 713/168 |
| 2008/0069338 A1* | 3/2008 | Relyea | 380/28 |
| 2008/0095357 A1* | 4/2008 | Kitamura et al. | 380/28 |
| 2010/0024029 A1 | 1/2010 | Sasaki et al. | |

FOREIGN PATENT DOCUMENTS

| | | |
|---|---|---|
| JP | 57-207453 | 12/1982 |
| JP | 2000-187438 | 7/2000 |
| JP | 2006-180457 | 7/2006 |

OTHER PUBLICATIONS

Pak-Keung Leun et al., "An Optimal Normal Basis Elliptic Curve Cryptoprocessor for Inductive RFID Application", Circuits and Systems, 2006, ISCAS 2006, Proceedings, 2006 IEEE International Symposium on Kos, Greece May 21-24, 2006, pp. 309-312.

Hasegawa T., et al., "A Practical Implementation of Elliptic Curve Cryptosystems over GF(P) on a 16-Bit Microcomputer", Public Key Cryptography, International Workshop on Practice and Theory in Public Key Cryptography, Feb. 5, 1998, pp. 182-194.

ECC White Papers, "The Elliptic Curve Cryptosystem for Smart Cards", May 1998, pp. 1-9.

L. Batina et al. "An Elliptic Curve Processor Suitable for RFID-Tags"; Cryptology ePrint Archive: Report 2006/227; Jul. 2006; printed on Aug. 23, 2011 from eprint.iacr.org/2006/227; pp. 1-17.

German transation of Japanese Office Action issued Aug. 24, 2011 in corresponding Japanese Patent Application 2009-529682; 9 pp.

German translation of Office Action issued Dec. 20, 2011 in corresponding Japanese Patent Application No. 2009-529682.

Tatsuaki Okamoto et al., "Cryptography/Zero-knowledge proof/ Number theory", Kyoritsu Shuppan K.K., Jun. 1995, pp. 228-231.

* cited by examiner $y^2 = x^3 - 6x + 9$ $y^2 = x^3 - 6x + 3$

METHOD FOR THE ENCRYPTED DATA EXCHANGE AND COMMUNICATION SYSTEM

CROSS REFERENCE TO RELATED APPLICATIONS

This application is based on and hereby claims priority to International Application No. PCT/EP2007/060113, filed on Sep. 24, 2007, and German Application No. 102007001074, filed Jan. 3, 2007, as well as German Application No. 1020060462262, filed Sep. 29, 2006, the contents of all of which are hereby incorporated by reference.

BACKGROUND

1. Field

The embodiments discussed herein relate to a method for encrypted data exchange between users of a communication system, and a communication system.

2. Description of the Related Art

The embodiments relate to the field of communications technology and in particular the area of contactless communication for identification purposes. Although applicable in principle to any communication systems, the embodiments and the problems which they address will now be explained with reference to so-called RFID communication systems and their applications, RFID standing for "Radio Frequency Identification". For the general background to this RFID technology, reference is made to the "RFID Handbook" [in German] by Klaus Finkenzeller, Hansa-Verlag, third revised edition, 2002.

In currently known RFID systems, typically an electromagnetic signal sent out from a base station (or reading station or reader) is picked up by a passive transponder (or tag) which obtains therefrom the energy required to power the transponder. In most UHF or microwave based RFID systems, in addition to this unidirectional energy transfer, bidirectional data communication typically also takes place on the basis of a so-called challenge/response procedure wherein the base station continuously sends out challenge (data request) signals which are only answered if an appropriate transponder is in the coverage area of that base station. In this case the transponder in the immediate vicinity of the base station reacts with a response signal. Such RFID transponders are used, for example, to tag objects such as products, documents and the like.

In contrast to conventional wireline data communication, data is transferred between base station and a corresponding transponder virtually autonomously and to a certain extent in the background, without a user having to be present at all. That is to say, data communication is initiated as soon as an authenticated transponder is in the coverage area of the associated base station. Whereas, for example, for reading a data carrier such as a diskette, a USB memory stick or similar, the data carrier must be deliberately brought into contact with a corresponding reading device by the user and in the case of wireline data communication, the data communication must likewise be deliberately initiated by the user, this is not the case with RFID-based wireless data communication.

This has a number of significant advantages, e.g. for identification in the logistics field, in department stores, etc. However, this RFID-based data communications technology also has a number of disadvantages which must be taken into account in many applications.

One such problem relates to the reading of data contained in an RFID transponder by an unauthorized user (attacker), particularly if the data is security-critical data. For these reasons an RFID-based data communication system typically also contains a security mechanism which, for example, protects data communication to the effect that a security code is modulated onto the transmit signal by the base station and can then be decoded and evaluated by the transponders permitted to communicate data. After successful evaluation, the transponder permitted to communicate data transmits a response signal likewise containing a security code back to the base station, which code can then be evaluated in the base station to authenticate the transponder. By this authentication it is ensured in the base station that no unauthorized user can eavesdrop on the data communication and therefore read security-critical data.

An essential consideration for transponder-based data communication is that it shall take place as simply and quickly as possible between base station and transponder. The reason for this is that, on the one hand, the transponder typically only has minimal resources, i.e. minimal energy resources but also minimal memory and computing resources, so that during authentication typically as little data as possible must be evaluated and authenticated. On the other hand, this authentication must also be carried out as quickly as possible, since particularly in the case of dynamic RFID-based data communication systems, the transponder to be authenticated is very often only present in the coverage area of the particular base station for a short period of time. Within this brief period, a data communication connection must be established, and must be authorized and then the data exchange must take place.

To secure data communication between base station and transponder, data is communicated in a cryptographically protected manner. The essential feature of these cryptographic encryption methods is that inversion, i.e. determining the private key from the public key, is virtually impossible in finite time using available computing capacities.

It has proved advantageous to use cryptographic encryption algorithms based on elliptic curves, as these provide a high degree of security for short key lengths. Such cryptographic encryption methods based on elliptic curves are very efficient, particularly due to the fact that with these methods, in contrast to known cryptographic methods, there is no known attack method with sub-exponential runtime. In other words, this means that the security gain per bit of the security parameters used in methods based on elliptic curves is higher and therefore much shorter key lengths can be used for practical applications. Cryptographic methods based on elliptic curves therefore provide better performance and require less bandwidth for transmitting the system parameters than other cryptographic methods with a comparable level of achievable security.

The cryptographic methods therefore represent a compromise between the security to be expected and the computational complexity involved in encrypting data. German patent application DE 101 61 138 A1 discloses that it is possible to determine the scalar multiple of a point solely on the basis of the X-coordinate of that point even without using the Y-coordinate. Corresponding computing rules are likewise described in this document for any fields. This makes it possible to achieve much more efficient point arithmetic implementations, e.g. a Montgomery ladder, for the scalar multiplications, a smaller number of field multiplications for each point addition, and a smaller number of registers for the point representation of the intermediate results.

Against this background, an aspect of the embodiments is to provide wireless data communication authentication which requires in particular less computational complexity while maintaining a high level of security, and which in particular is also fast.

SUMMARY

Accordingly there is provided the features discussed below.

A method for encrypted data exchange between users of a communication system using encryption based on elliptic curves, wherein, initiated by a challenge of a first user, a scalar multiplication is calculated by the second user using a certificate in the second user, only part of the result of the scalar multiplication being sent back to the first user as a response. The embodiment relates to a communication system.

A communication system for authenticating the users of the communication system using an encryption method.

For authentication between two users of a communication system and, in particular, for transmission of a response from a transponder back to a base station, the idea behind the embodiments is to reduce this data to be transmitted back.

For authentication of a transponder by a base station, an authentication protocol based on a challenge/response procedure is typically used. According to this authentication protocol, the transponder, for example, when challenged by the base station, calculates a scalar multiplication and obtains as a result an x-coordinate in a randomly selected projective representation. This projective representation, which in binary notation is a number, contains two values (X, Z) which in binary notation can be represented as a string. In hitherto known methods, for back transmission of the response, both values, i.e. the x-coordinate pair (X, Z), are returned as the response signal from the transponder to the base station.

The insight on which the embodiments are is based recognizes that, for transmission of the projective representation of the x-coordinate, it is not necessary for both values to be sent back to the base station by the transponder. In fact, it is sufficient if just one of these two values is sent back in its entirety and the second value at least partially. Even with this quasi incomplete response, the base station is still capable of performing authentication with a relatively high degree of security. The particular advantage of this it that it enables the response data transmitted back by the transponder to be reduced, which provides an overall reduction in the amount of response data to be transferred for authentication purposes. As a result, the transponder requires less time for back transmission, authentication and the associated arithmetic operations. Altogether, it enables the entire authentication process to be made significantly simpler and also faster, without authentication involving any substantial loss of security.

For example, the transponder transmits only part, e.g. half, of one of the two x-coordinate values. This is implemented by, for example, only transmitting back the upper part or rather the upper half or else the lower part or rather the lower half of the correspondingly calculated x-coordinate value. The base station then checks whether this part or more specifically half of the value coincides with the corresponding part or more specifically half of the value corresponding to this calculated value. Only if the part or rather half of the bits are identical will the transponder sending the response data be accepted as authentic by the base station.

The inventive authentication method with the variant of data reduction in particular applications of the transponder wherein the transponder transmits back projectively represented coordinates as a response, has various advantages:

The amount of x-coordinate bits to be transmitted in the projective representation is significantly reduced. In the above mentioned case where only half the bits of one of the two values is transmitted, the total amount of data to be transmitted is then reduced by a quarter.

In many applications, such as in the authentication protocol specified in the present application, the data reduction causes only a negligible reduction in security. It is a known result of cryptography that, over a finite field GF(2d), an elliptic curve suitable for cryptographic applications only provides a security level of 2d/2-1. This means that, although field elements with a length of d bits are used, the security of this kind of authentication using a public key only corresponds to a key length of d/2-1. Therefore, from the point of view of an unauthorized user, it is just as difficult to crack the authentication method, and thereby obtain the secret key of the transponder, as it is to provide a valid response for response return transmission in the case of the above described inventive authentication method with reduced data volume. Depending on the application and the security requirement specified or even necessary, it is possible to reduce still further the number of bits of the x-coordinate partially transmitted from the transponder to the base station.

The untransmitted bits constitute a randomly generated secret which is known only to the transponder and the base station involved in the data communication. These untransmitted bits can be used e.g. as a key in subsequent protocol steps of the authentication method. This means that in the case of the inventive authentication method with data reduction, by only partially transmitting projectively represented x-coordinates, the protocol for (unilateral) authentication is upgraded to a protocol for (unilateral) authentication with key agreement.

In a variant of the authentication method, if the transponder can perform divisions in the finite field and thus calculate the affine representation of the coordinates of the response, the authentication method can also be applied to the affine value. In this case the number of bits to be transmitted is likewise significantly reduced, typically to half of the bits to be transmitted.

Advantageous embodiments and further developments will emerge from the description taken in conjunction with the figures in the accompanying drawings.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1A:
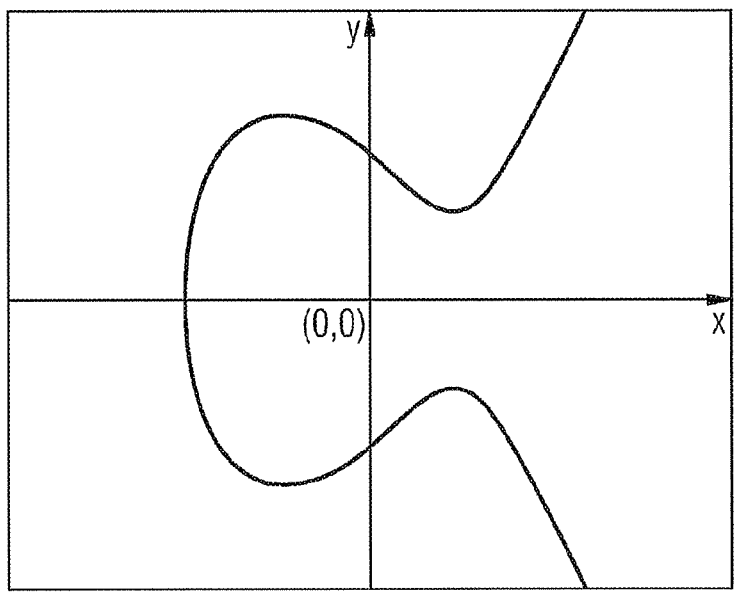
FIGS. 1A and 1B show examples of an elliptic curve.

Reference will now be made in detail to the embodiments, examples of which are illustrated in the accompanying drawings, wherein like reference numerals refer to like elements throughout.

In the figures in the accompanying drawings, identical and functionally equivalent elements, features and signals are provided with the same reference characters unless stated otherwise.

The authentication method has a new security protocol which is based on elliptic curve arithmetic. Before the authentication method is described, the most important properties of elliptic curves will therefore first be explained with reference to FIGS. 1A and 1B.

An elliptic curve over a finite field (Galois field) GF(2d) is the zero set of the cubic equation $$y2+xy=y3+ax2+b. \qquad (1)$$

where x and y denote variables and the coefficients a and b with b≠0 denote coefficients in the Galois field GF(2d).

Figure 1B:
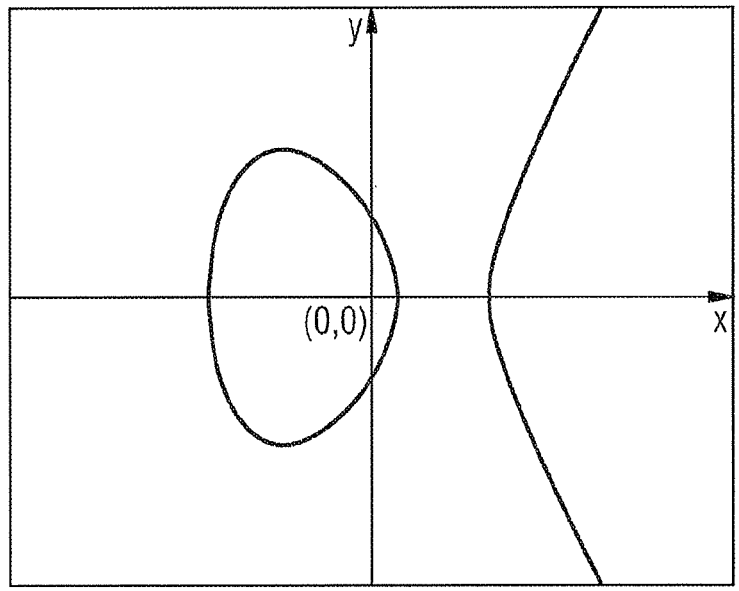

By way of example, FIG. 1A and FIG. 1B show two elliptic curves over the real numbers.

Figure 2:
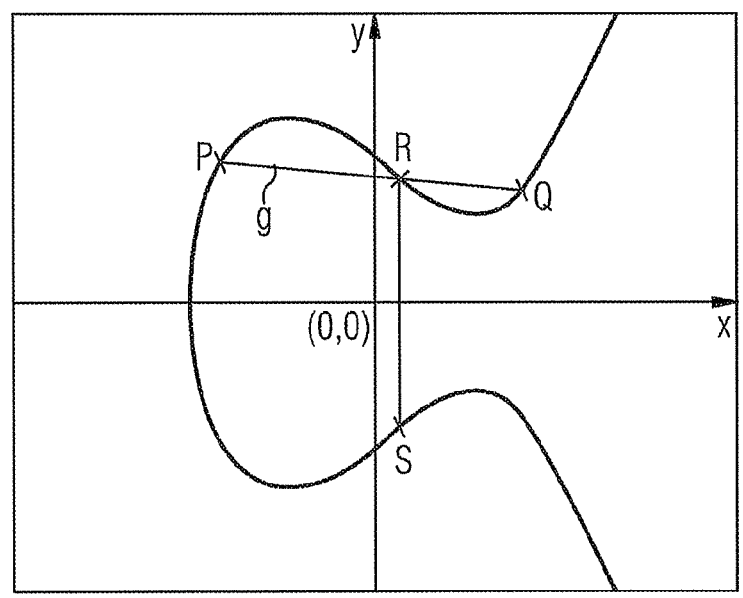
FIG. 2 shows an example of an addition using an elliptic curve.

With the addition of an infinitely distant point as a neutral element, these zero sets constitute an additive group whose law of composition can be interpreted geometrically at least for elliptic curves over the real fields. Such an additive group includes of a set of numbers and an addition (group operation). In this group a neutral element also exists whose value does not change when it is added to a number from the number set (e.g. the zero). In addition, an inverse element exists for each value of the set of numbers, so that the neutral element is obtained when the corresponding value is added to the inverse element, two results from the algebraic geometry being essential (see FIG. 2):

Each straight line intersects an elliptic curve at three not necessarily different points. For every two not necessarily different points a third point can be calculated so that the sum of the three points represents the neutral element. If P and Q (with P≠-Q) are two points and g the straight line through these points P, Q, the straight line g intersects the elliptic curve at a third point R. By reflecting R on the X-axis we get S-P+Q. For the case P=−Q, the slope of g is infinite and the third point of intersection R is the infinitely distant point.

Scalar multiplication on elliptic curves is defined similarly to the definition of scalar multiplication in vector space. Let P be a point on an elliptic curve and k a natural number. The scalar multiplication k*P corresponds to a k-times addition of P to itself. This scalar multiplication k*P constitutes the essential building block of cryptographic systems based on elliptic curves. In the case of cryptographically strong elliptic curves, scalar multiplication represents a one-way function, i.e. it can be calculated in polynomial time, but inverted only in exponential time. An efficient algorithmic reconstruction of the scalar is therefore difficult to imagine. This one-way function forms the basis of cryptographic authentication methods based on elliptic curves.

A known method for implementing such scalar multiplications based on elliptic curves is the so-called Montgomery ladder or also Montgomery algorithm. The Montgomery ladder can be implemented such that, to calculate the x-coordinate of a scalar multiple of a point P, only the x-coordinate of P and exclusively additions and multiplications in the Galois field GF(2d) are used. No complex inversions are required here. The inventive bilateral authentication method described below is based on this Montgomery algorithm.

Before the bilateral authentication method is described, the basic structure of a communication system will first be explained in greater detail with reference to the block diagram in FIG. 3.

Figure 3:
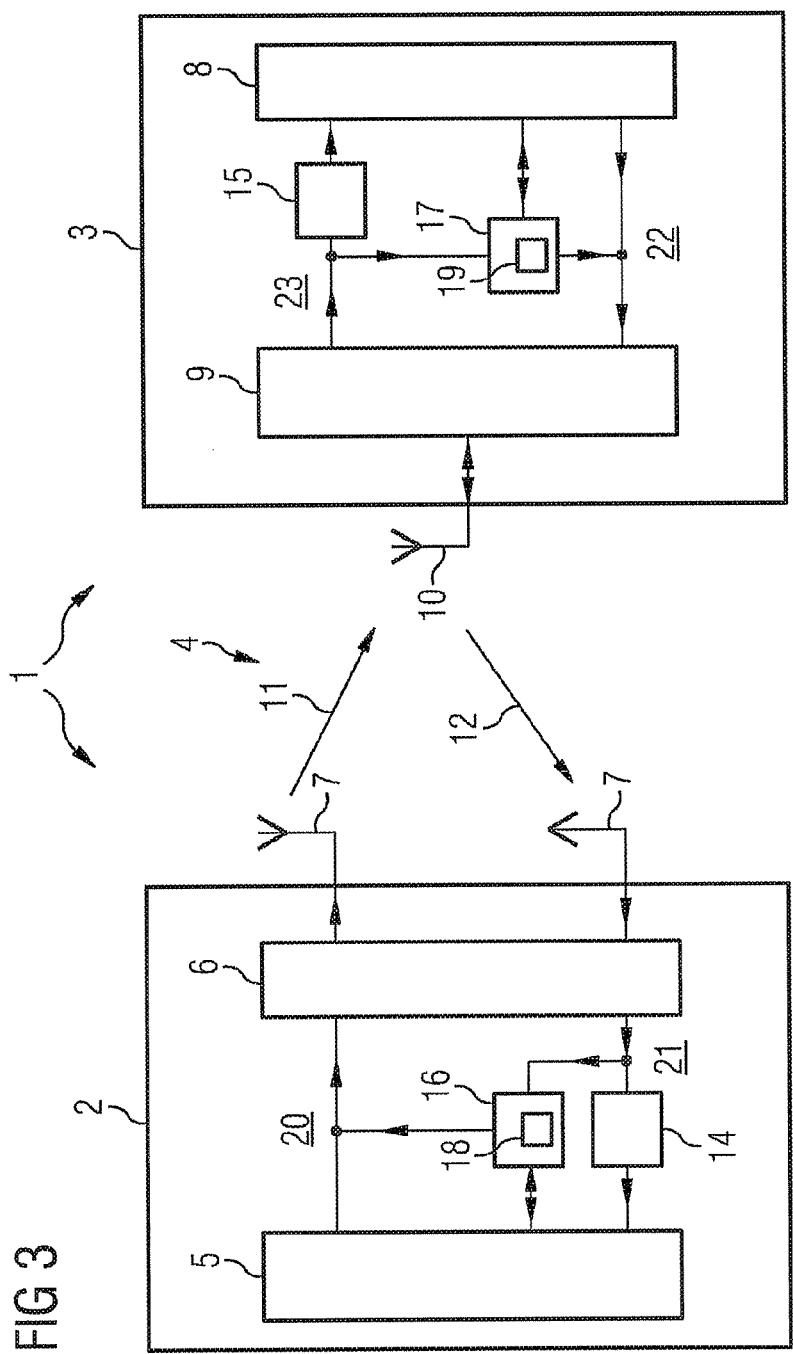
FIG. 3 is a block diagram showing the structure of a communication system.

In FIG. 3 a communication system, e.g. an RFID communication system, is denoted by the reference character 1. The RFID communication system 1 contains a first user (base station 2) and at least one second user (transponder 3). The base station 2 and transponder 3 are in bidirectional communication via a wireless communication link 4. The communication system 1 can be implemented, for example, as a so-called master-slave communication system 1, the base station 2 e.g. acting as master and the transponder or transponders 3 e.g. acting as slaves.

The base station 2 comprises a control device 5, a transceiver 6 and a transmit/receive antenna 7. In the same way, the transponder also comprises a control device 8, a transceiver 9 and a common transmit/receive antenna 10.

The transmit/receive antennas 7, 10 can be implemented as inductive coil antennas or else as bipolar antennas.

The data communication process is controlled in the respective control devices 5, 8. For this purpose, each of the control devices typically contains a computing device (arithmetic unit, CPU) in which the machine operations, in particular for authentication, are performed. The control devices 5, 8 can be designed, for example, as program-controlled devices such as a microcontroller or microprocessor, or also implemented in hard-wired logic circuitry e.g. as FPGA or PLD.

The control device 5 of the base station 2 is designed to transmit radio-frequency carrier signals 11 via the antenna 7 to the antenna 10 of the transponder 3. In the same way, the control device 8 and the transceiver 9 of the transponder 3 are designed to return corresponding response signals 12 to the base station 2 in response to the transmitted carrier signals 11.

The base station 2 additionally has an evaluation device 14. This evaluation device 14 is disposed in the receive path 21 of the base station 2 and is disposed downstream of the receiver of the transceiver 6. Similarly, the transponder 3 also has an evaluation device 15 in the receive path 23 of the transponder 3. The data received during data communication is evaluated in the respective evaluation devices 14, 15 where, in particular, demodulation and decoding of the received data is also performed.

According to the embodiments, both the base station 2 and the transponder 3 now have an authentication module 16, 17 disposed between the respective transceiver 6, 9 and control device 5, 8 of the base station 2 and transponder 3. These authentication modules 16, 17 are implemented here as separate modules. However, an authentication module 16, 17 can be an integral part of the respective control device 5, 8.

An authentication module 16, 17 also has a memory 18, 19 containing e.g. data, keys or the like required for authentication or having to be temporarily stored. The memories 18, 19 typically include RAM in which e.g. computing results are stored. Additionally or alternatively, these memories 18, 19 can also comprise an EEPROM memory in which system parameters, parameters of the different communication users such as a user-specific private key, a public key, a user-specific certificate or the like are stored.

The principle of the inventive authentication method (or authentication protocol) will be explained by way of example with reference to the schematic diagrams in FIGS. 4 and 5.

Figure 4:
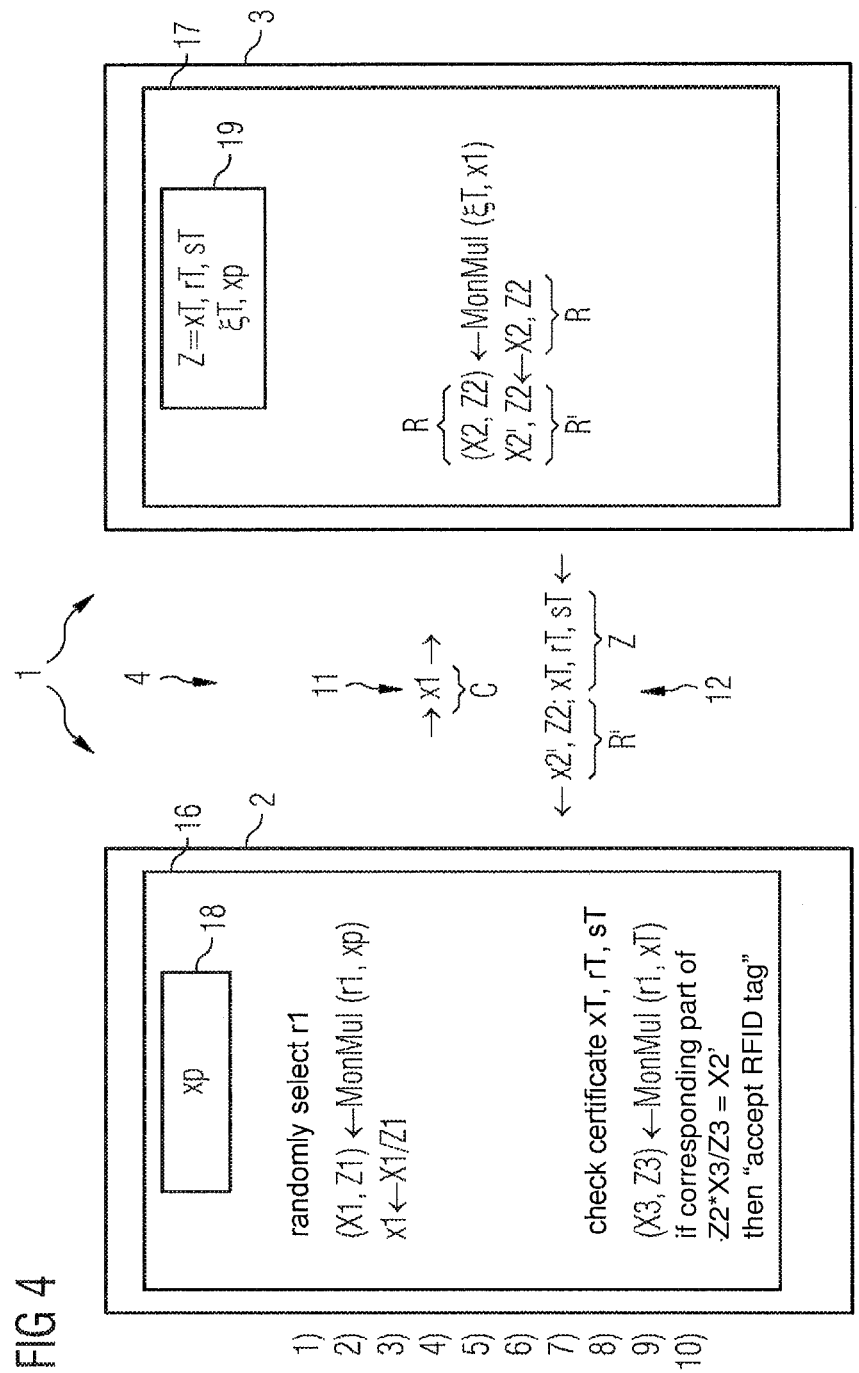
FIG. 4 shows a flow chart illustrating the authentication method based on elliptic curves.

FIG. 4 schematically illustrates the base station 2 and the transponder 3 of the communication system 1, only the authentication modules 16, 17 and the memory devices 18, 19 inside these items of equipment 2, 3 being shown. It shall be assumed that public keys are stored in the base-station-side memory device 18 and the transponder's certificate Z, the transponder-side secret key and in some cases the public key are stored in the memory device 19 of the transponder 3.

An example of the inventive authentication method based on elliptic curves will now be described with reference to the flow chart in FIG. 4.

The following parameters are predefined as system parameters, i.e. as parameters which apply to the entire communication system 1 and therefore to authentication overall.

A suitable elliptic curve is predefined.

xp denotes an affine x-coordinate of the base point P on the elliptic curve.

xs denotes a public key, i.e. one that is known to the base station and the transponder, for signature verification.

The following parameters are predefined for the transponder 3:

T denotes the transponder-side secret key, i.e. which the base station 2 does not know.

xT,rT,sT denote the certificate Z of the transponder 2, xT denoting the public key (affine x-coordinate of the point T=T*P) and rT,sT the signature of xT, verifiable with the public key xS.

The authentication method illustrated in FIG. 4 is executed as follows:

In steps 1)-3) the base station 2 generates the challenge C=x1. For this purpose a value r1 is randomly selected. The base station 2 then calculates from this value r1 and the system parameter xp the challenge (X1, Z1) which represents the projective x-coordinate of the point P (P=r1*xp). These two values X1, Z1 are arranged in a binary sequence, thereby mapping the challenge x1. This challenge x1 represents the x-coordinate of the point P1=r1*P for a random scalar.

In step 4), the base station 2 transmits this challenge C=x1 to the transponder 3.

In step 5) the response R is calculated. Here the transponder 3 calculates for the challenge x1 the corresponding response data R=(X2,Z2) which represents the projective x-coordinates of the point P2=T*P1=T*(r1*P).

In step 7) the response data R'=(X2', Z2) generated by the transponder 3 is transmitted back to the base station 2 together with the certificate Z=xT,rT,sT of the transponder 3.

The base station 2 checks the certificate Z=xT,rT,sT of the transponder 3 in step 8). If the certificate Z is not valid, the base station 2 rejects the transponder 3 as not authentic.

In steps 9) and 10) the base station 2 checks the response of the transponder 3. The base station 2 calculates the calculated projective x-coordinate (X3,Z3) of the point P3=r1*T=r1* (T*P) and in doing so checks whether the data (X2',Z2) transmitted by the transponder 3 with the data (X3,Z3) produced in the base station 2 can be projective coordinates of the same point. This is precisely the case if, for the scalar multiplications:

$$X3*Z2=X2*Z3.$$

If this relation holds true, the transponder 3 is authentic. If this is not the case, the base station 2 rejects the transponder 3 sending the response data R' as not authentic.

The essential point here is that the generation of the challenge C and of the response R, R' as well as the corresponding certificates Z are predefined such that the corresponding authentication protocol can be carried out on the basis of elliptic curves over the Galois field GF(2d).

In hitherto known methods, the entire x-coordinate (X2, Z2) of the point P2 was transmitted back to the base station, i.e. of the x-coordinate both values X2,Z2 of the response R were transmitted back in their entirety. This means that step 5) was immediately followed by step 7). According to the embodiments, an additional step 6) is now provided between steps 5) and 7). This additional step 6) constitutes a data reduction step. In this step 6) the response data R=(X2,Z2) generated by the transponder 3 and which is a randomly selected projective representation of the x-coordinate of the point P2, is data-reduced. Data reduction for one of these two values (X2,Z2) is therefore performed here in step 6).

In the exemplary embodiment in FIG. 5 it shall be assumed that data reduction is performed for the first value X2 of the projective representation of the x-coordinate (X2,Z2) so that the x-coordinate now has the two values (X2',Z2), and X2' has a data-reduced content compared to the value X2. Then, in step 7), this data-reduced response R'=(X2',Z2) is transmitted from the transponder 3 to the base station 2 together with the certificate Z of the transponder 3.

It is self-evident that, additionally or alternatively, instead of data reduction of the first value X2 of the x-coordinate, data reduction of the respective second value Z2 can also be performed.

The base station 2 then checks whether the number (X3, Z3) calculated in the base station 2 coincides with the response R' transmitted by the transponder 3. However, as this response R'=(X2',Z2) is not complete, but is present in data-reduced form, only the corresponding part of the term X3*Z2/Z3 is checked against the component of the response X2'. Only if this corresponding part of the number X3*Z2/Z3 coincides with X3' is the transponder 3 accepted as authentic by the base station 2.

Figure 5A:
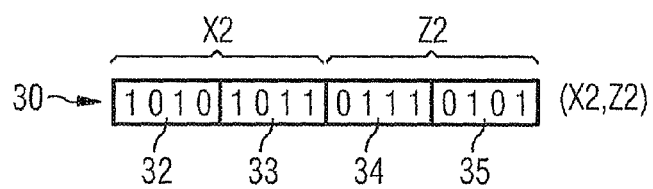
FIGS. 5A-5C show schematics diagrams to explain the method for data reduction of the response data and the method for comparing this data-reduced response data with calculated response data.

This method for data reduction and the corresponding method for comparing these data-reduced values will now be briefly explained with reference to schematic diagrams in FIGS. 5A-5C:

FIG. 5A shows the x-coordinate or more specifically the number 30 generated with step 5). First of all, FIG. 5A shows the structure of the number 30. This number 30 contains two numerical values X2, Z2. This x-coordinate 30 and its values X2, Z2 are represented here in binary coding. It shall be assumed that each of the two values X2, Z2 is eight bits wide and these two eight-bit wide values X2, Z2 are disposed directly adjacent to one another. The entire x-coordinate 30 is therefore 16 bits wide. In the example shown, the value X2 of this number 30 is subdivided into an upper four-bit-wide half 32 with the bit sequence 1010 and a lower four-bit-wide half 33 with the bit sequence 1011. The value Z2 of the number 30 also has two bit halves 34, 35 with the bit sequences 0111 and 0101.

In step 6) a data-reduced number 31 with the values X2', Z2 is generated from the number 30. For this purpose, e.g. the upper half 32 of the value X2 is disregarded for generating the data-reduced number 31, i.e. the data-reduced number 31 only contains the lower half 33 of the value X2 as well as the complete value Z2. Following data reduction in step 6) the data-reduced x-coordinate 31 only contains the lower half 33 of the value X2 and both halves 34, 35 of the value Z2. The upper half 32 of the value X2 is now no longer a component part of the data-reduced x-coordinate 31, and is therefore also not transmitted back to the base station 2 by the transponder 3.

Figure 5B:
Figure 5B:
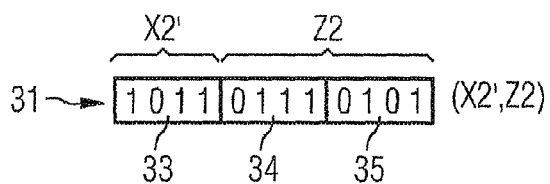

In the example shown in FIG. 5B, the upper half 32 has been disregarded for the data-reduced x-coordinate 31. It would of course also be conceivable for the lower half 33 of the value X2 or one of the two halves 34, 35 of the value Z2 to be disregarded here. Moreover, precisely the half 32 of the value X2 and therefore four bits of the eight-bit content of the value X2 have been disregarded. Any non-zero data reduction of the value X2 would be conceivable here, i.e. it would also be conceivable, for example, to disregard only one to seven bits of the value X2 for generating the data-reduced x-coordinate.

Step 10) will now be described with reference to FIG. 5C. FIG. 5C shows the structure of the x-coordinate or more specifically the number 37 which contains the values X3, Z3. In a corresponding manner, the values X3, Z3 have upper and lower bit halves 38-41.

Provided that the two x-coordinates of the numbers 30, 37 correspond to one another, it must hold true that (X2, Z2)= (X3, Z3), i.e. the binary number 30 with the string of binary values X2, Z2 corresponds to the binary number 37 with the corresponding string of binary values X3, Z3.

For authenticity checking, the number 37 is now not compared with the original number 30 but can only be compared with the transmitted data-reduced number 31 received by the base station 2. However, as the bit widths of these two numbers 31, 37 are different, only parts of the number 31 are compared with the corresponding parts of the number 37. This means that the upper half 32 of the value X2, which half is not contained in the data-reduced number 31, is also not compared with the upper half 38 of the value X3 of the number 37. Therefore, only the sections 33-35 of the number 31 are compared with the corresponding sections 39-41 of the number 37, so that it is checked whether the section 33 corresponds to the section 39, the section 34 to the section 40 and the section 35 to the section 41.

Figure 5C:
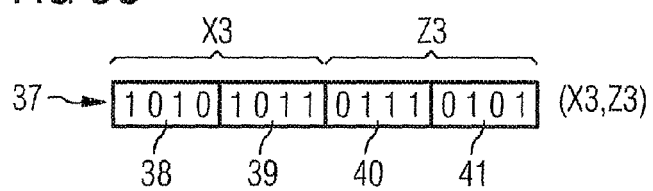

In the present case of FIG. 5C, the bit contents of the sections 33-35 are identical to the respective bit contents of the sections 39-41, so that in this case the base station 2 identifies the transponder 3 which has sent the data-reduced number 31 as being authentic, even though the upper section 32 of the value X2 is not compared with the upper section 38 of the corresponding value X3. This is based on the insight that, particularly if the bit width of the numbers 30, 37 to be compared is very large, it is sufficient to transmit only part of these values and compare it with the corresponding part of the value X3, Z3 to be compared. If these two mutually comparable sections coincide, it can also be assumed with a very high degree of probability that these corresponding values X2, X3 and therefore also the corresponding number 30, 37 are identical.

Although the has been described above with reference to an exemplary embodiment, it is not limited thereto but can be modified in various ways.

Thus the embodiments shall in particular not be limited exclusively to RFID systems, but also be extended, for example, to item identification. Such items often do not need to be uniquely identified. Here it often suffices that the presence e.g. of a defective item can be eliminated. This is mainly also known as non-unique identification. For the operation of the transponder in this context, the latter acts as a sensor. The embodiments therefore also relate expressly to such sensors for which communication is undertaken for reading and writing data carrier data or sensor data.

The embodiments are is also intended to relate to any data communication systems which are not necessarily RFID systems and which are not necessarily of the wireless type.

In FIGS. 3 and 4, for the sake of clarity, the structure of the RFID system and in particular of the transponder and base station has deliberately been shown in greatly simplified form. It is self-evident that the base station and the corresponding transponder can likewise contain the functional units, such as demodulator, modulator, power supply, synchronization device, decoder and the like, for data communication between base station and transponder.

In FIGS. 3 and 4 a distinction has been drawn between control device, evaluation device and authentication module. It is self-evident that these devices or parts thereof can be e.g. an integral part of the control device or can also be implemented separately therefrom.

It should likewise be noted that both the base station and the transponder can have a single transceiver and an associated transmit/receive antenna. It would obviously also be conceivable for the base station and/or the transponder to have separate transceivers and in particular a transmit antenna and a separate receive antenna.

Although the above described data communication system and data communication method have been described on the basis of the "reader talks first" principle, the "tag talks first" principle would of course also be conceivable, whereby the base station initially waits for a transponder's challenge. However, this second mentioned principle has a poorer reaction time, so that particularly in the case of so-called modern "long-range" data communication systems of the kind used for RFID, for example, the "reader talks first" principle is preferably employed.

It goes without saying that the inventive authentication method described with reference to FIG. 5A-5C is to be taken merely as an example. There, the individual steps and mathematical operations applied can obviously also be altered and modified in the context of the embodiments, e.g. by functionally identical or alternative steps.

It should also be noted that the numerical data and bit widths specified are to be understood merely as examples and the embodiments should in any case not be limited thereto. In particular, it would also be conceivable to use a larger or a smaller bit width for the respective values, and nor, moreover, do the various sections of a value need to have an identical bit width, but can be different. The same applies to the bit widths of the two values X, Z of a respective projective x-coordinate.

The system also includes permanent or removable storage, such as magnetic and optical discs, RAM, ROM, etc. on which the process and data structures can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for encrypted data exchange between users of a communication system using elliptic curve cryptography over a finite field $GF(2^d)$, comprising:
    calculating by a second user transponder, when challenged by a first user base station, the projective x-coordinate (X,Z) of the result of a first scalar multiplication;
    transmitting only a subset of bits of a coordinate as a part of the result of the scalar multiplication back to the first user as a response: and
    comparing data contained in the response with a result of a second scalar multiplication by a first user base station, wherein the first user accepts the second user as authentic provided that corresponding data of the response and of the result of the second scalar multiplication coincide, wherein the first user checks the response received from the second user for its authenticity using only the part of the result without recovering a full result.

2. The method as claimed in claim 1, wherein the challenge and/or the response in each case contains an x-coordinate of a point on an elliptic curve.

3. The method as claimed in claim 2, wherein the x-coordinate is present in binary form and only a part of bits of the x-coordinate contained in the response is transmitted.

4. The method as claimed in claim 2, wherein the x-coordinate of the point on the elliptic curve contained in the challenge and/or the response is present in projective representation.

5. The method as claimed in claim 2, wherein, in binary notation, a coordinate of the point is a number which contains a first and a second value which can be represented as a binary sequence.

6. The method as claimed in claim 5, wherein only a part of bits of at least one of the first and second values is transmitted back.

7. The method as claimed in claim 5, wherein half of bits of at least one of the first and second values is transmitted back.

8. The method as claimed in claim 5, wherein, with reference to a most significant bit, an upper bit range of bits, in particular an upper half of the bits of at least one of the first and second values, is transmitted back.

9. The method as claimed in claim 1, wherein the first user checks whether data contained in the response and data of a result of a second scalar multiplication are coordinates of a same point.

10. The method as claimed in claim 1, wherein only those parts of the result of the second scalar multiplication which correspond to the part of the response transmitted by the second user to the first user are used for comparing the response data with the result of the second scalar multiplication.

11. The method as claimed in claim 1, wherein the part of the result of the first scalar multiplication that was not transmitted back as a response represents a randomly generated result known to at least one of the two users, preferably both users and which can be used as a secret key in subsequent steps.

12. The method as claimed in claim 1, wherein the method is an authentication method based on a challenge-response procedure for authenticating the second user to the first user and/or vice versa.

13. The method as claimed in claim 1, wherein the challenge of the first user is independent of a key of the second user.

14. The method as claimed in claim 1, wherein an elliptic curve suitable for cryptographic methods and an affine x-coordinate of a base point of the elliptic curve and a public key for signature checking are provided as system parameters of the communication system.

15. The method as claimed in claim 1, wherein only a key known to the second user and a certificate of the second user are provided as parameters of the second user.

16. The method as claimed in claim 15, wherein the second user's certificate is transmitted by the second user along with the response, this certificate being checked for validity in the first user using a public key known to the first and second users.

17. A communication system for authenticating the users of the communication system comprising a transponder and a base station using cryptography as claimed in claim 1.

18. The system as claimed in claim 17, wherein the first user and at least one second user connected via a data communications link, the first user and the second user each having an authentication module for performing authentication.

19. The system as claimed in claim 18, wherein the authentication module of a respective user has a computing device for performing calculations, checks and authentications within the respective authentication module.

20. The system as claimed in claim 17, wherein each user has a memory in which system parameters and parameters associated in each case with this user are stored.

21. The system as claimed in claim 17, wherein the first and second users are communication users of the communication system, in particular of a communication system implemented as an Radio Frequency Identification system.

22. The method as claimed in claim 1, wherein the subset comprises an upper half or order of the coordinate bits.

23. The method as claimed in claim 1, wherein the subset comprises the subset to a lower half or order of the coordinate bits.

* * * * *